United States Patent [19]
Musket et al.

[11] Patent Number: 6,033,583
[45] Date of Patent: Mar. 7, 2000

[54] VAPOR ETCHING OF NUCLEAR TRACKS IN DIELECTRIC MATERIALS

[75] Inventors: Ronald G. Musket, Danville; John D. Porter, Berkeley; James M. Yoshiyama, Fremont, all of Calif.; Robert J. Contolini, Lake Oswego, Oreg.

[73] Assignee: The Regents of the University of California, Oakland, Calif.

[21] Appl. No.: 08/851,258

[22] Filed: May 5, 1997

[51] Int. Cl.⁷ .................................................. C03C 21/00
[52] U.S. Cl. ................ 216/56; 216/57; 216/62; 216/64; 216/80; 216/87; 216/97
[58] Field of Search .................... 216/56, 57, 62, 216/63, 64, 73, 74, 79, 80, 87, 96, 97

[56] References Cited

U.S. PATENT DOCUMENTS

| | | | |
|---|---|---|---|
| 3,662,178 | 5/1972 | Caputi et al. | 216/87 |
| 3,713,921 | 1/1973 | Fleischer et al. | 216/56 |
| 3,770,532 | 11/1973 | Bean et al. | 250/472.1 |
| 3,802,972 | 4/1974 | Fleischer et al. | 216/57 |
| 4,245,229 | 1/1981 | Stephens | 346/135.1 |
| 4,338,164 | 7/1982 | Spohr | 313/346 R |
| 5,462,467 | 10/1995 | Macaulay et al. | 445/50 |
| 5,562,516 | 10/1996 | Spindt et al. | 445/24 |
| 5,580,421 | 12/1996 | Hiatt et al. | 438/708 |
| 5,801,477 | 9/1998 | Macaulay | 313/309 |

*Primary Examiner*—Randy Gulakowski
*Assistant Examiner*—Allan Olsen
*Attorney, Agent, or Firm*—L. E. Carnahan

[57] ABSTRACT

A process involving vapor etching of nuclear tracks in dielectric materials for creating high aspect ratio (i.e., length much greater than diameter), isolated cylindrical holes in dielectric materials that have been exposed to high-energy atomic particles. The process includes cleaning the surface of the tracked material and exposing the cleaned surface to a vapor of a suitable etchant. Independent control of the temperatures of the vapor and the tracked materials provide the means to vary separately the etch rates for the latent track region and the non-tracked material. As a rule, the tracked regions etch at a greater rate than the non-tracked regions. In addition, the vapor-etched holes can be enlarged and smoothed by subsequent dipping in a liquid etchant. The 20–1000 nm diameter holes resulting from the vapor etching process can be useful as molds for electroplating nanometer-sized filaments, etching gate cavities for deposition of nano-cones, developing high-aspect ratio holes in trackable resists, and as filters for a variety of molecular-sized particles in virtually any liquid or gas by selecting the dielectric material that is compatible with the liquid or gas of interest.

24 Claims, 3 Drawing Sheets

6,033,583

VAPOR ETCHING OF NUCLEAR TRACKS IN DIELECTRIC MATERIALS

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to creating holes in a dielectric material, particularly to etching high aspect ratio holes in dielectric materials, and more particularly to a process involving vapor etching of nuclear tracks in dielectric materials for creating high aspect ratio isolated cylindrical holes in dielectric materials.

Fused silica (i.e., $SiO_2$) glass layers are excellent dielectric isolation layers for many applications, such as microelectronics (including field emission cathodes for flat panel displays), fine filters for biological purposes, electrochemical separation purposes, etc.

The formation of holes, openings, or passages in dielectric materials, such as polymers and fused silica glass, has involved directing high-energy charged particles on the material thereby forming latent nuclear tracks in the dielectric material, followed by etching. The passage of an atomic particle through a dielectric material can result in the creation of a latent nuclear track that extends along a straight corresponding to the path of the atomic particle. This latent track has a diameter of 5–20 nm with bonding and density different from the non-tracked regions. The presense of the tracks is normally revealed by submersion of the tracked material in a liquid of a suitable etchant. However, the shape of the etched hole is often not cylindrical but conical with the largest diameter being near the surface. This is a consequence of the comparable etch rates in the latent track and the non-tracked region. This effect has been demonstrated for liquid etching of only a few dielectric materials (e.g. polycarbonate). In fact, commercial filters (i.e., Millipore filters) result from the liquid etching of tracked polycarbonate material. Thus, there is a need for a process which can create high aspect ratio cylindrical holes in various dielectric materials, such as dielectric polymer, silicon nitride, fused silica, etc.

At least two fabrication schemes for field emission cathodes for flat panel displays would benefit from a process that etches a straight cylindrical hole through the fused silica layer: 1) the nano-filament arrangement, and 2) the nano-cone arrangement. For the nano-filament application, a small diameter, straight, cylindrical hole is required as a mold for the electroplating of the nano-filament. For the nano-cone application, a controlled etching of the cavity for deposition of the nano-cone by evaporation or sputtering is required. In the latter case, the etching time is considerablly longer for the same etching conditions than for the nano-filament case because a much wider hole is desired. In both cases, a process is needed to produce uniformly sized and shaped holes over very large areas (i.e. at least 10 inches).

In addition, both the nano-filament and the nano-cone arrangements require a well-defined hole in a trackable resist material (e.g., dielectric polymer) or a hard mask (e.g. silicon nitride or fused silica). These well-defined holes can be achieved using the process of the present invention, which involves vapor etching. Utilizing the vapor etching process independent control of the temperatures of the vapor and the tracked materials provides a means to vary separately the etch rates for the latent track regions and the non-tracked region, thereby producing high aspect ratio straight cylindrical holes in a diameter range of 20–1000 nm. Also, by utilizing the vapor etching process of this invention, sub-micron holes can be formed in fused silica enabling its use as fine filters.

SUMMARY OF THE INVENTION

It is an object of the present invention to provide a process for forming high aspect ratio straight cylindrical holes in a dielectric material.

A further object of the invention is to provide vapor etching of nuclear tracks in dielectric materials.

A further object of the present invention is to provide a controlled vapor etching process to form well defined sub-micron holes in resist or hard mask materials.

Another object of the invention is to provide a process using vapor etching for creating well-defined holes in a trackable material for use in the fabrication of nano-filaments and nano-cones for field emission cathodes.

Another object of the invention is to create straight sub-micron holes in fused silica to enable fabrication of fine filters made of fused silica.

Another object of the invention is to provide vapor etching of nuclear tracks in dielectric material to enable creating high aspect ratio, straight, cylindrical holes having a diameter of 20–1000 nm.

Other objects and advantages of the present invention will become apparent from the following description and accompanying drawings. Basically, the invention involves vapor etching of nuclear tracks in dielectric materials. Independent control of the temperatures of the etching vapor and the tracked material provides the means to vary separately the etch rates for the latent track regions and the non-tracked material. The 20–1000 nm diameter holes resulting from the vapor etching process could be useful as molds for electroplating nanometer-sized filaments, etching gate cavities for deposition of nano-cones for gated field emitters, developing high aspect ratio holes in trackable resists and in materials used as filters for a variety of molecular-sized particles in virtually any liquid by selecting the dielectric material that is compatible with the liquid of interest.

BRIEF DESCRIPTION OF THE DRAWINGS

The accompanying drawings, which are incorporated into and form a part of the disclosure, illustrate embodiments of the process of the invention and, together with the description, serve to explain the principles of the invention.

FIGS. 1–4, 7, and 8 illustrate the process of the invention for the formation of microgates with nano-cones.

DETAILED DESCRIPTION OF THE INVENTION

Figure 6:
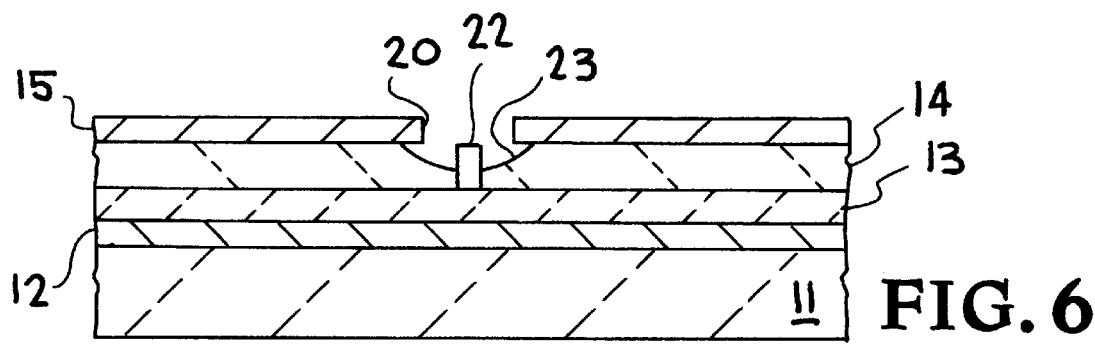
Figure 14:
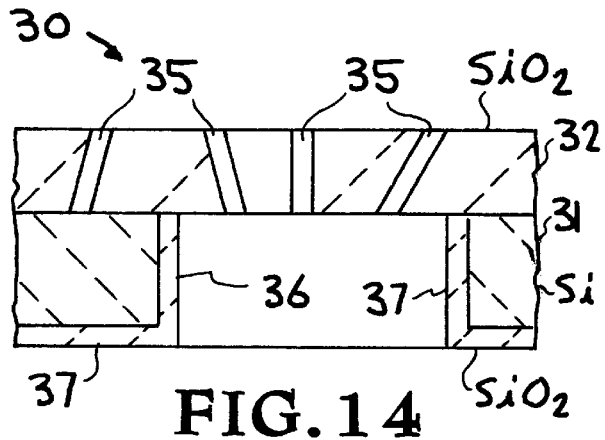

The present invention is directed to vapor etching of nuclear tracks in dielectric materials for creating straight, high aspect ratio (i.e., length much greater than diameter), isolated cylindrical holes in the dielectric materials. The passage of an atomic particle through a dielectric material can result in the creation of a latent nuclear track that extends along a straight line corresponding to the path of the atomic particle. This latent track has a diameter of 5–20 nm with bonding and density different from the non-tracked region. Thus, there is a different etching rate of the tracked and non-tracked regions of the material, and generally the shape of etched holes along the nuclear tracks previously have been conical with the largest diameter being near the surface. In order to produce a nearly cylindrical hole the etch rate in the latent track region must be very high compared to the non-tracked region. This is accomplished by the vapor etching process of the present invention, wherein independent control of the temperatures of the vapor and the tracked materials provide the means to vary separately the etch rates for the latent track regions and the non-tracked material. In addition, the vapor-etched holes can be enlarged and smoothed by subsequent dipping in a liquid etchant. This vapor etching process has been demonstrated for bulk fused silica and thermal fused silica and can be extended to other dielectric materials, such as polymers and silicon nitride. The 20–1000 nm diameter holes resulting from the vapor etching process are useful as molds for electroplating nanometer-sized filaments, as illustrated in FIG. 6, etching gate cavities for deposition of nano-cones, illustrated in FIG. 8, developing high-aspect ratio holes in trackable resists, and fused silica for the formation of molecular filters, as illustrated in FIG. 14. Thus, in addition to the invention being useful in the production of field emission cathodes in flat panel video displays, and the production of molecular filters for biological purposes, for cleaning of contaminated waste liquids, and for electrochemical separation purposes, it can be utilized wherever there is a need to form straight, high aspect ratio holes in dielectric materials, particularly where nuclear tracks in the dielectric materials are utilized. Basically, the process consists of cleaning the surface of the tracked material and exposing the cleaned surface to a vapor of a suitable etchant. Separate etch rates for the latent track regions and the non-tracked materials are provided by independent control of the temperatures of the vapor and of the tracked material.

Since fused silica ($SiO_2$) glass layers are excellent dielectric isolation layers for microelectronics applications, such as field emission cathodes, and because fused silica is one of the most inert, non-reactive materials, it can be utilized in filters in a much broader range of liquids than conventionally used materials such as polycarbonate. The vapor etching process of the present invention, enables the formation of straight, high aspect ratio holes in fused silica, thus enabling a wide use of this material.

The process of the present invention is described hereinafter relative to its use in forming nano-filaments and nano-cones for microelectronic applications and for forming holes in fused silica for fine-filter applications, such are exemplary only.

EXAMPLE I

Figure 1:
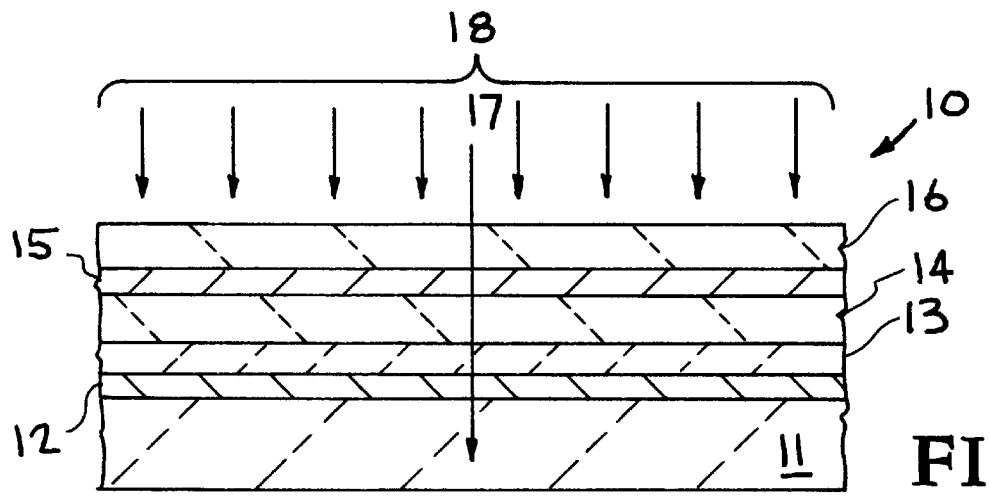
FIGS. 1–6 illustrate the process of the invention for fabricating microgates with nano-filaments as shown in FIG. 6.
Figure 2:
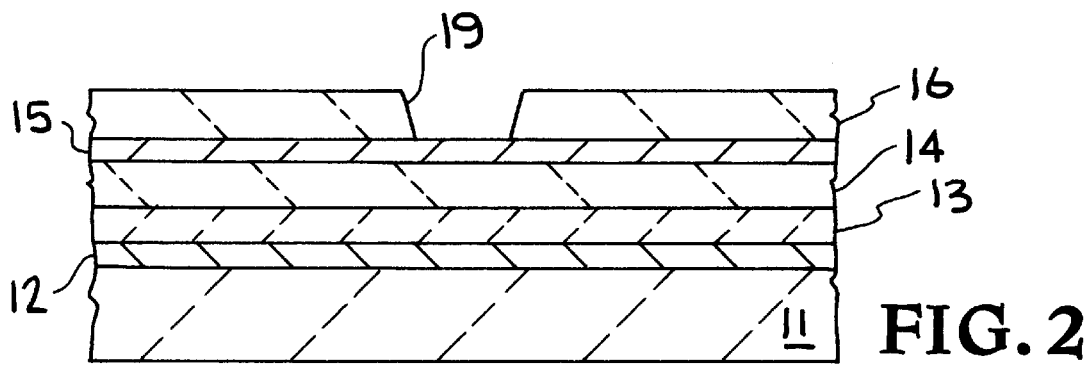

A self-aligned process for the production of microgates with nano-filaments, with reference to FIG. 1–6, is as follows, wherein as illustrated in FIG. 1, a device, such as a field emission cathode, generally indicated at 10, comprises a substrate 11, composed of silicon, for example, a metal layer 12, composed of a nickel alloy, for example, a resistive layer 13, composed of a mixed oxide, for example, a dielectric or insulator layer 14, composed of fused silica, for example, a gate metal layer 15, composed of a nickel alloy with chromium overlayer, for example, and an insulator layer 16 composed of polycarbonate, for example. By way of example, the substrate 11 may have a thickness of 0.7 to 1.1 mm and may be additionally composed of glass; the metal layer 12 may have a thickness of a few hundred nm; the resistive layer 13 may have a thickness of a few hundred nm; the dielectric or insulator layer 14 may have a thickness of a few hundred nm; the gate metal layer 15 may have a thickness of 50 to 200 nm; and the insulator layer 16, which may be composed of either a trackable resist or a hard mask, may have a thickness of 100 to 1000 nm, and if a trackable resist it can be composed of a dielectric polymer such as polycarbonate, and if a hard mask it can be composed of silicon nitride or fused silica.

With the device 10, formed as indicated in FIG. 6, the following processing step as carried out as indicated in FIGS. 1–6:

1. Create latent nuclear tracks in at least the device 10, as indicated at 17 (only one shown), by exposing it to high energy atomic particles indicated by arrows 18. This may be accomplished, for example, by irradiating the surface uniformly with sufficiently energetic ions (e.g., 15.2 MeV Xe for $SiO_2$, few MeV Xe for polycarbonate, >20 MeV Xe for $SiN_x$) to doses of $10^6$–$10^9/cm^2$ with the ions incident along or near the surface normal.

2. Clean the surface of the tracked material by dipping very briefly in a suitable etchant or cleaning solution or wiping using a suitable cleaning solution. For example, an $SiO_2$ surface can be cleaned by dipping for a time period of 4 seconds in a meaning solution of 1:4 $HF:H_2O$. This step is optional depending on the specific tracked material.

3. The example shown in FIG. 2 resulted from liquid etching of a latent track and does not provide a cylindrical hole. If a cylindrical hole is needed here then the treatment consists of exposing the surface of layer 16 to a vapor of a suitable etchant to form a hole 19 therein, see FIG. 2. For example with layer 16 composed of $SiO_2$, the etchant is composed of 1:4 $HF:H_2O$, with a vapor temperature of 24.5° C. with an equilibrium vapor pressure, and with the temperature of layer 16 being held at 31° C.

Figure 3:
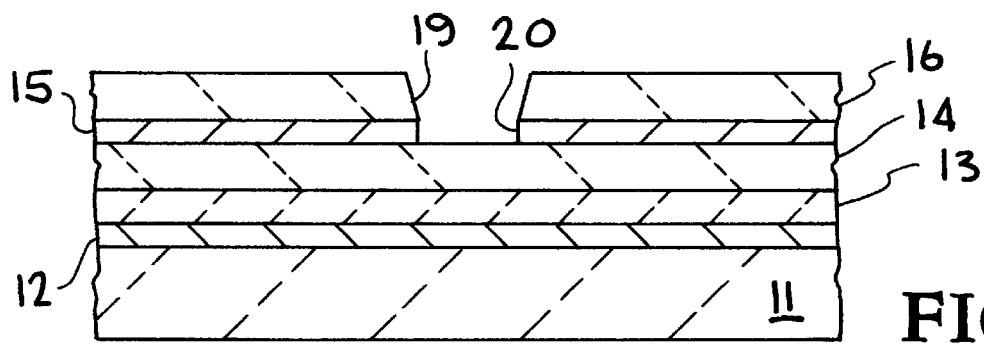
Figure 4:
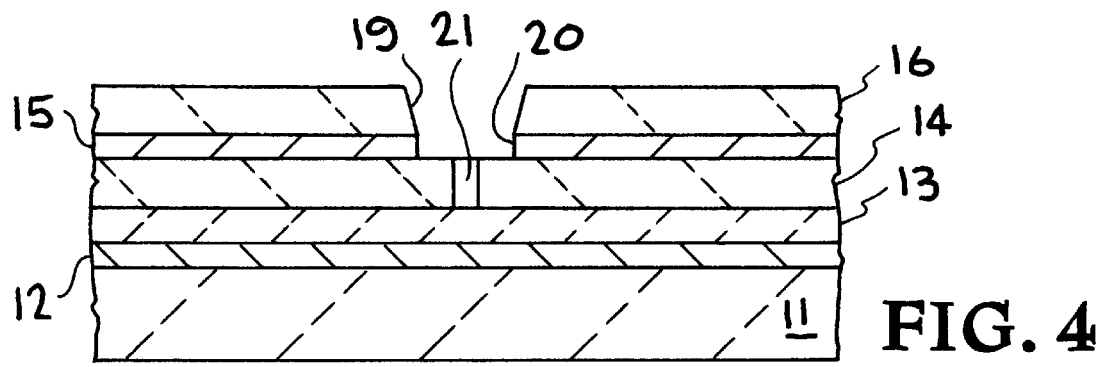

4. Etching a hole 20 in the gate metal layer 15, see FIG. 3, is accomplished for example using standard reactive ion etching using the layer 16 as a mask.

5. Vapor etching a hole 21, see FIG. 4, in layer 14. For example, if layer 14 is composed of $SiO_2$, an etchant composed of 1:4 $HF:H_2O$ would be used for a time period of 1 hour at a vapor temperature of 24.5° C. with an equilibrium vapor pressure and with layer 14 being at a temperature of 31° C. Independent control of the temperatures of the vapor etchant and the tracked material provides the means to vary separately the etch rates for both the latent track regions and the non-tracked material, whereby a straight, high aspect ratio hole, such as hole 21 in FIG. 4 can be formed.

6. Rinse the vapor-etched material in de-ionized water to end the vapor etching.

7. (Optional) Enlarge and smooth the vapor etched hole 19 and 21 by dipping in a suitable liquid etchant, then rinse in de-ionized water to end the liquid etching.

Figure 5:
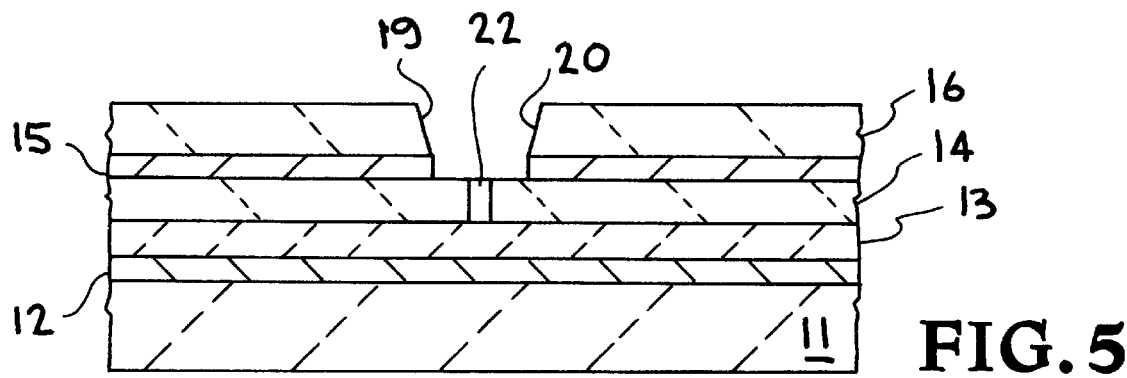

8. Form a nano-filament 22 in the hole 21 of layer 14, as seen in FIG. 5, by electroplating or other deposition means. For example, the nanofilament 22 may be composed of nickel or platinum, having a length equal to the thickness of layer 14 and a diameter of 20 to 1000 nm.

9. Removal of the layer 16 is accomplished by either the reactive ion etching process that puts the hole in layer 15 or by suitable dipping in liquid etchants.

10. Vapor etch back a region or cavity 23 of layer 14, as shown in FIG. 6, whereby the nano-filament 22 extends from layer 14 by extended exposure of the material of layer 14 to the vapor etchant.

EXAMPLE II

A self-aligned process for the production of microgates with nano-cones, with reference to FIGS. 1–4, 7 and 8, is as follows:

1. Repeat steps 1–7 of Example I above.

Figure 7:
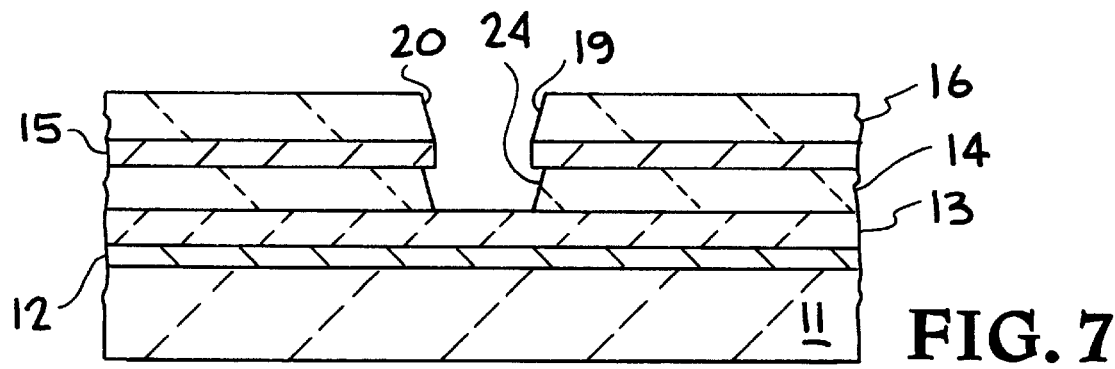

2. Vapor etch back a region or cavity 24, as shown in FIG. 7, using the procedure of step 10 of Example I above.

Figure 8:
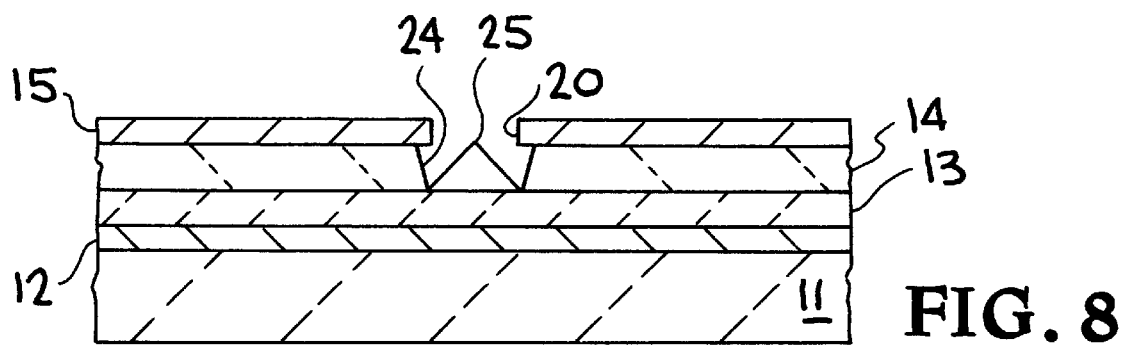
Figure 9:
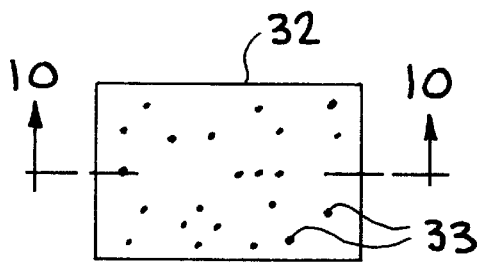
FIGS. 9, 11, and 13 are plan views, with FIGS. 10, 12, and 14 being respective cross-sectional views illustrating operational steps in accordance with the invention for making a fused silica filter on silicon.
Figure 10:
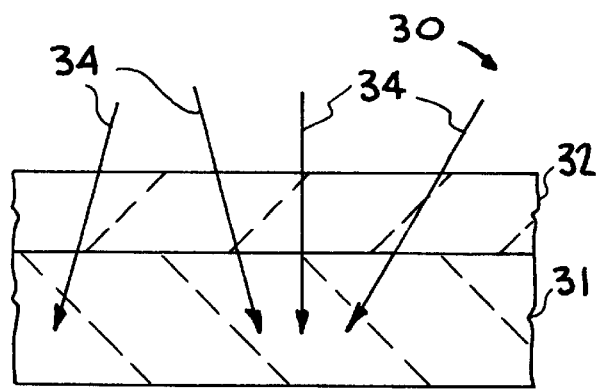

3. Remove the layer 16, as shown in FIG. 8, using the procedure of step 9 of Example I above.

4. Forming a nano-cone 25 in cavity 24, as shown in FIG. 8. This may be accomplished, for example, by deposition using evaporation or sputtering. The nano-cone 25 may be composed of molybdenum or tantalum.

EXAMPLE III

A process for making a fused silica filter on a silicon substrate using vapor etching of latent nuclear tracks, as shown in FIGS. 9–14, with an embodiment of the filter 30 illustrated in FIG. 14, composed of a substrate 31 of silicon (Si) and a layer 32 of fused silica ($SiO_2$), is as follows:

1. Irradiate at least the fused silica layer 32 with energetic ions indicated at 33 in FIG. 9 as described above in step 1 or Example I, to form a random pattern of tracks 34 in the irradiated material, see FIG. 10, at either a single angle relative to the plane of the film (e.g. 90°) or at a variety of angles as shown.

Figure 11:
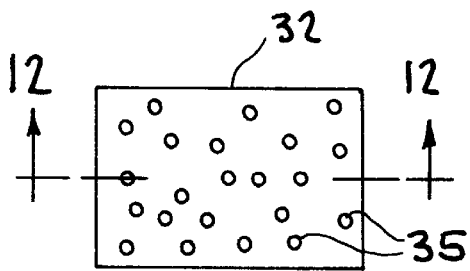
Figure 12:
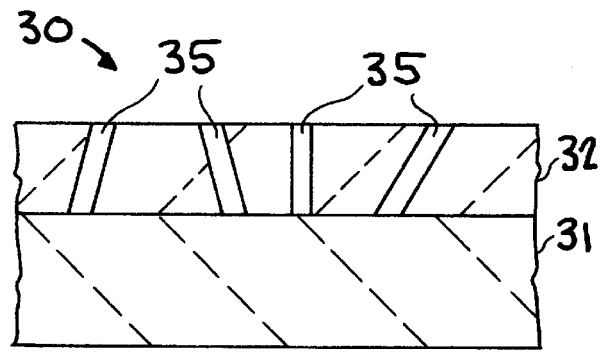

2. Vapor etch the tracks 34 in the fused silica layer 32 to form holes 35 therein, as shown in FIGS. 11 and 12.

Figure 13:
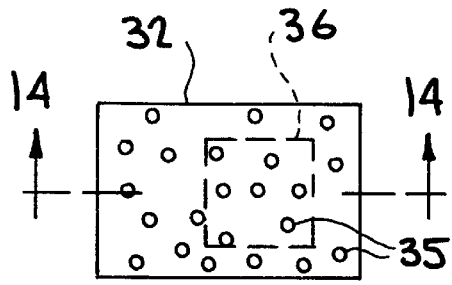

3. Using lithography to pattern the silicon substrate 31, openings 36, only one shown, are etched in the substrate, as shown in FIGS. 13 and 14, which forms a waffle-like support structure for the fused silica layer 32. This pattern is accomplished using conventional lithography, and then the exposed silicon is etched to form the opening 36 using standard liquid etchants.

4. Thermal oxidation of the opening 36 indicated by layer 37 of the structure shown in FIGS. 13 and 14 (at ~1000° C. in oxygen gas or water vapor) is needed to ensure that all the surfaces in FIG. 14 exposed to any filtered liquid or gas are $SiO_2$ surfaces, which are more inert than silicon surfaces. The oxidation ($SiO_2$) layers 37 are formed by standard techniques.

Thus, as shown in FIG. 14, a fused silica filter is formed, and the diameter of the holes 35 is controlled by controlling the temperature of the vapor etch and the temperature of the fused silica layer 32 and the time of exposure to the vapor etchant. For example, the temperature of the vapor etch may be 24.5° C. and the temperature of the fused silica layer may be 31° C.

Scanning electron microscope photographs have been made of the top and cross-sectional views of a tracked and vapor etched thermal fused silica layer on silicon. Those photographs showed that material tracked with 15.2 MeV Xe ions to a fluence of 2 to $3\times10^9/cm^2$, cleaned by dipping in 1:4 $HF:H_2O$ liquid for 4 seconds, and vapor etched for one hour using the vapor of the same liquid at 24.5° C. with the substrate at 31° C. resulted in cylindrical holes with the hole diameters being about 60 nm in the thermal fused silica layer with thickness of about 50 nm. Less than 5% of the original $SiO_2$ thickness was removed in this etching process.

It has thus been shown that the vapor etching process of the present invention has the capability of forming 20–1000 nm diameter holes in dielectric materials that may, for example, be used for molds for electroplating nanometer-sized filaments, etching gate cavities for deposition of nano-cones, developing high aspect ratio holes in trackable resists and as filters for a variety of molecular-sized particles in virtually any liquid or gas by selecting the dielectric material that is compatible with the liquid of interest.

While particular examples of the vapor etching process have been described and illustrated and particular materials, parameters, energies, etc., have been described to exemplify and set forth the principles of the invention, such are not intended to be limiting. Modifications and changes may become apparent to those skilled in the art, and it is intended that the invention be limited only by the scope of the appended claims.

The invention claimed is:

1. A process for forming straight, high aspect ratio holes in a dielectric material, including:

forming nuclear tracks in a dielectric material, vapor etching the tracks to form holes in the dielectric material, and independently controlling the temperatures of the vapor etchant and the tracked dielectric material to provide separate etch rates of the track regions and the non-tracked regions of the material.

2. The process of claim 1, additionally including cleaning the surface of the tracked material.

3. The process of claim 1, additionally including subjecting the vapor-etched holes to a liquid etchant for enlarging and smoothing the holes.

4. The process of claim 1, additionally including providing the dielectric material selected from the group consisting of fused silica, polymers, and silicon nitride.

5. The process of claim 1, wherein the holes are etched in the dielectric material to have a diameter of about 20–1000 nm.

6. The process of claim 1, wherein the dielectric material is fused silica, and wherein the forming of the nuclear tracks is carried out with 15.2 MeV Xe ions to a fluence range of $1\times10^6$ to $3\times10^9/cm^2$.

7. The process of claim 1, wherein the vapor etching is carried out using a vapor of a liquid etch composed of 1:4$HF:H_2O$ and at a vapor etch temperature of 24.5° C. and a dielectric material temperature at 31° C.

8. The process of claim 7, wherein the vapor etching was carried out over a time period of about one hour.

9. The process of claim 2, wherein the cleaning is carried out by dipping in 1:4$HF:H_2O$ liquid for about 4 seconds at room temperature.

10. A process for vapor etching nuclear tracks in a substrate supported dielectric material for the formation of molds, cavities, and high aspect ratio holes in the dielectric material, comprising:

providing at least a layer of dielectric material on a substrate, forming nuclear tracks in at least the layer of dielectric material, cleaning the tracked dielectric material, exposing the tracked dielectric material to a vapor etchant to form holes therein, independently controlling the temperatures of the vapor etchant and the tracked material for controlling separate etch rates of the tracked and non-tracked material, and rinsing the vapor-etched materials.

11. The process of claim 10, additionally including enlarging and smoothing holes formed by the vapor etchant by dipping at least the dielectric material in a liquid etchant, followed by rinsing.

12. The process of claim 10, wherein rinsing of the etched material is carried out in a de-ionized water.

13. The process of claim 11, wherein rinsing of the etched material is carried out in de-ionized water.

14. The process of claim 10, additionally including forming the layer of dielectric material from a group consisting of fused silica, polymers, and silicon nitride.

15. The process of claim 10, wherein the layer of dielectric material is fused silica, and wherein the vapor etchant is composed of a ratio of HF and $H_2O$.

16. The process of claim 10, wherein the holes formed by the vapor etchant are of a 20–1000 um diameter.

17. The process of claim 10, additionally including forming at least a resistive layer intermediate the substrate and the layer of dielectric material, and forming at least a metal layer over the layer of dielectric material, and including etching at least one hole in the metal layer, and then vapor etching an aligned hole in the dielectric material.

18. The process of claim 17, additionally including forming a metal layer between the substrate and the resistive layer.

19. The process of claim 17, additionally including utilizing the aligned hole in the dielectric material as a mold for forming a nano-filament therein by an electroplating process, and then removing dielectric material adjacent at least a portion of the nano-filament by vapor etching.

20. The process of claim 17, wherein the vapor etching is utilized to form a cavity in the dielectric material aligned with the hole in the metal layer, and then forming a nano-cone in the cavity by a physical vapor deposition process.

21. The process of claim 10, additionally including forming openings in the substrate to produce a waffle-like support for the layer of dielectric material.

22. A process for forming a filter, comprising:

providing at least one layer of dielectric material on a substrate, forming nuclear tracks in at least the one layer of dielectric material, cleaning the tracked dielectric material, forming holes in the tracked dielectric material, and forming openings in the substrate to expose the holes in the dielectric material.

23. The process of claim 22, additionally including form an oxidation layer on exposed surfaces of the substrate.

24. The process of claim 22, additionally including processing the substrate to ensure that all surfaces exposed to liquid, gas, or other materials to be filtered are inert and non-reactive.

* * * * *